(12) United States Patent
Bremer et al.

(10) Patent No.: US 11,505,047 B2
(45) Date of Patent: *Nov. 22, 2022

(54) TARP DEPLOYING DEVICE WITH QUICK RELEASE ARM

(71) Applicant: Sioux City Tarp, Inc., Sioux City, IA (US)

(72) Inventors: Donald William Bremer, Sioux City, IA (US); Terry L. Berg, Sioux City, IA (US)

(73) Assignee: Sioux City Tarp, Inc., Sioux City, IA (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/247,902

(22) Filed: Dec. 29, 2020

(65) Prior Publication Data

US 2021/0146761 A1 May 20, 2021

Related U.S. Application Data

(63) Continuation of application No. 15/999,127, filed on Aug. 17, 2018, now Pat. No. 10,875,390.

(60) Provisional application No. 62/554,377, filed on Sep. 5, 2017, provisional application No. 62/546,697, filed on Aug. 17, 2017.

(51) Int. Cl.
*B60J 7/08* (2006.01)
*B60P 7/04* (2006.01)

(52) U.S. Cl.
CPC ............ *B60J 7/085* (2013.01); *B60P 7/04* (2013.01)

(58) Field of Classification Search
CPC .... B60J 7/085; B60J 7/102; B60J 7/12; B60P 7/02; B60P 7/04
USPC .................. 296/98, 100.11–100.15
See application file for complete search history.

(56) References Cited

U.S. PATENT DOCUMENTS

| | | |
|---|---|---|
| RE31,746 E | 11/1984 | Dimmer et al. |
| 4,834,445 A | 5/1989 | Odegaard |
| 5,765,901 A | 6/1998 | Wilkens |
| 8,272,676 B2 | 9/2012 | Bremer |
| 8,910,996 B2 | 12/2014 | Bremer |
| 8,931,823 B2 | 1/2015 | Bremer et al. |
| 9,637,040 B1 | 5/2017 | Berg |
| 10,703,180 B2* | 7/2020 | Searfoss .......... B60J 7/085 |
| 10,875,390 B2* | 12/2020 | Bremer .......... B60J 7/085 |
| 11,104,214 B2* | 8/2021 | Hunter .......... B60J 7/085 |
| 2003/0052505 A1 | 3/2003 | Searfoss |
| 2011/0101728 A1 | 5/2011 | Bourcier et al. |
| 2013/0234466 A1 | 9/2013 | Schmeichel |
| 2013/0241230 A1 | 9/2013 | Knight et al. |
| 2013/0249236 A1 | 9/2013 | Smith et al. |
| 2017/0113525 A1 | 4/2017 | Bielfelt et al. |

(Continued)

*Primary Examiner* — Gregory A Blankenship
(74) *Attorney, Agent, or Firm* — McKee, Voorhees & Sease, PLC

(57) ABSTRACT

A tarp deploying apparatus includes radial arm with a proximal radial arm and a distal arm. The distal arm is formed from a flexible material such as a double-walled hydraulic hose. The distal arm attaches to a tarp roller to deploy the tarp over a storage area on a trailer with at least one rear door. The radial arm is mounted on a mounting bracket secured to one of the doors. A releasable connector between the arms permits the distal arm to be separated from the proximal arm so that the rear doors on the trailer can be opened and closed without interference from the radial arm.

14 Claims, 4 Drawing Sheets

(56) References Cited

U.S. PATENT DOCUMENTS

| | | |
|---|---|---|
| 2019/0111769 A1 | 4/2019 | Bremer |
| 2019/0111770 A1 | 4/2019 | Hunter |
| 2019/0389288 A1* | 12/2019 | Hunter .................. B60J 7/085 |
| 2022/0025700 A1* | 1/2022 | Reeder .................. E06B 9/68 |

* cited by examiner

TARP DEPLOYING DEVICE WITH QUICK RELEASE ARM

CROSS-REFERENCE TO RELATED APPLICATIONS

This application is a continuation filed pursuant to 35 USC § 120 of U.S. patent application Ser. No. 15/999,127, filed Aug. 27, 2018, which application claims priority under 35 U.S.C. § 119(e)(1) to U.S. Provisional Application Ser. No. 62/554,377, filed Sep. 5, 2017 and U.S. Provisional Application Ser. No. 62/546,697 filed Aug. 17, 2017; all of which are hereby incorporated by reference in their entireties.

FIELD OF THE INVENTION

This invention relates generally to the field of tarp deploying devices for use on trailers.

BACKGROUND OF THE INVENTION

Trailers may be used to haul loose items or materials that may benefit from being selectively covered and uncovered by a tarp. Several mechanisms have been devised for deploying the tarps across the trailer bed. Many of these devices include radial arms that are rotatably mounted at the front and rear of the trailer and have a roll of tarp disposed between them. As the radial arms rotate in one direction across the trailer, the roll of tarp between the arms is unrolled to cover the contents of the trailer. When the arms are rotated back in the opposite direction, the tarp is taken back up upon the roll to uncover the trailer. Examples of such devices for side dump trailers may be seen in Searfoss, U.S. Pat. No. 6,206,449, Michel, U.S. Pat. No. 5,002,328, and Bremer, U.S. Pat. No. 8,272,676; and for rear dump trailers in Bremer, U.S. Pat. No. 8,910,996.

Another type of trailer that utilizes a tarp is a trailer that is accessed through a hinged doorway. Most commonly these are walk-in trailers with bows or hoops that support the tarp between two vertical walls over a flat horizontal floor. The aforementioned tarp deploying apparatuses are not well suited for use on trailers with double doors because the radial arms interfere with opening and closing the double doors. Similarly, these existing designs are not well suited for trailers with a single door that is hinged to open from one of the sides, because in either the open or closed configuration, opening the door would move the end of the arm supporting the tarp in a lateral arc away from the tarp roller.

Accordingly, there is a need for a tarp deploying device that permits the rear doors to be opened and closed without interference.

BRIEF SUMMARY OF THE INVENTION

According to one embodiment, the present invention relates to a tarp deploying apparatus adapted to be mounted on a trailer of the type having a rear door. The apparatus includes a mounting bracket adapted to be attached to the rear door. A proximal radial arm is pivotally mounted to the mounting bracket. A distal arm has a first end and a second end, the distal arm is connectable to the proximal radial arm at the first end of the distal arm. A tarp spindle is mounted at the second end of the distal arm and has a tarp rolled upon it. A releasable connector connects the proximal radial arm to the first end of the distal arm. The distal radial arm may be a flexible member to permit angular movement of the second end of the distal arm relative to the proximal radial arm. The flexible member may be a hydraulic hose. The releasable connector may be a sliding collar hydraulic coupler. The hydraulic coupler may have a male portion affixed to the first end of the distal arm and a female portion affixed to the proximal radial arm.

According to another embodiment is the present invention is directed to a walk-in trailer that has a trailer body including a front wall, left and right sidewalls, a floor spanning between lower portions of the front, left and right sidewalls, and a door hingedly attached to a rear portion of one of the left and right sidewalls. The front wall, sidewalls, floor, and the door define a walk-in storage area. A mounting bracket is affixed to the rear door. A proximal radial arm is pivotally mounted to the mounting bracket. A distal arm has a first end and a second end. The distal arm is connectable to the proximal radial arm at the first end of the distal arm. A tarp spindle is mounted at the second end of the distal arm. The tarp spindle has a tarp rolled upon it. A releasable connector connects the proximal radial arm to the first end of the distal arm. The proximal radial arm is rotatable between an open position wherein the tarp is rolled upon the spindle and the storage area is uncovered by the tarp and a closed position wherein the tarp is at least partially unrolled off of the spindle and the storage area is covered beneath the tarp. When the proximal radial arm is in the closed position the arm interferes with opening the door if the distal arm is connected to the proximal radial arm, but if the distal arm is disconnected from the proximal radial arm at the releasable connector the door can be opened without interference

DETAILED DESCRIPTION OF THE PREFERRED EMBODIMENT

The present invention relates to a tarp deploying apparatus that is used on the rear of a trailer that has one or more rear doors. Existing radial arm tarp deploying systems are not well-suited for use with trailers that have rear doors because if the radial arm is mounted the door, because it is impossible to open the doors because the arm prevents the door on which is mounted from being opened by being constrained by the tarp roller. The tarp deploying system shown and described in this application overcomes that difficulty by making the radial arm easily separable into one portion attached to the door and one section attached to the tarp. The door on which the arm is mounted is no longer constrained by the tarp and in double-door configurations, the second door is no longer trapped by the arm extending across it to the tarp.

Figure 1:
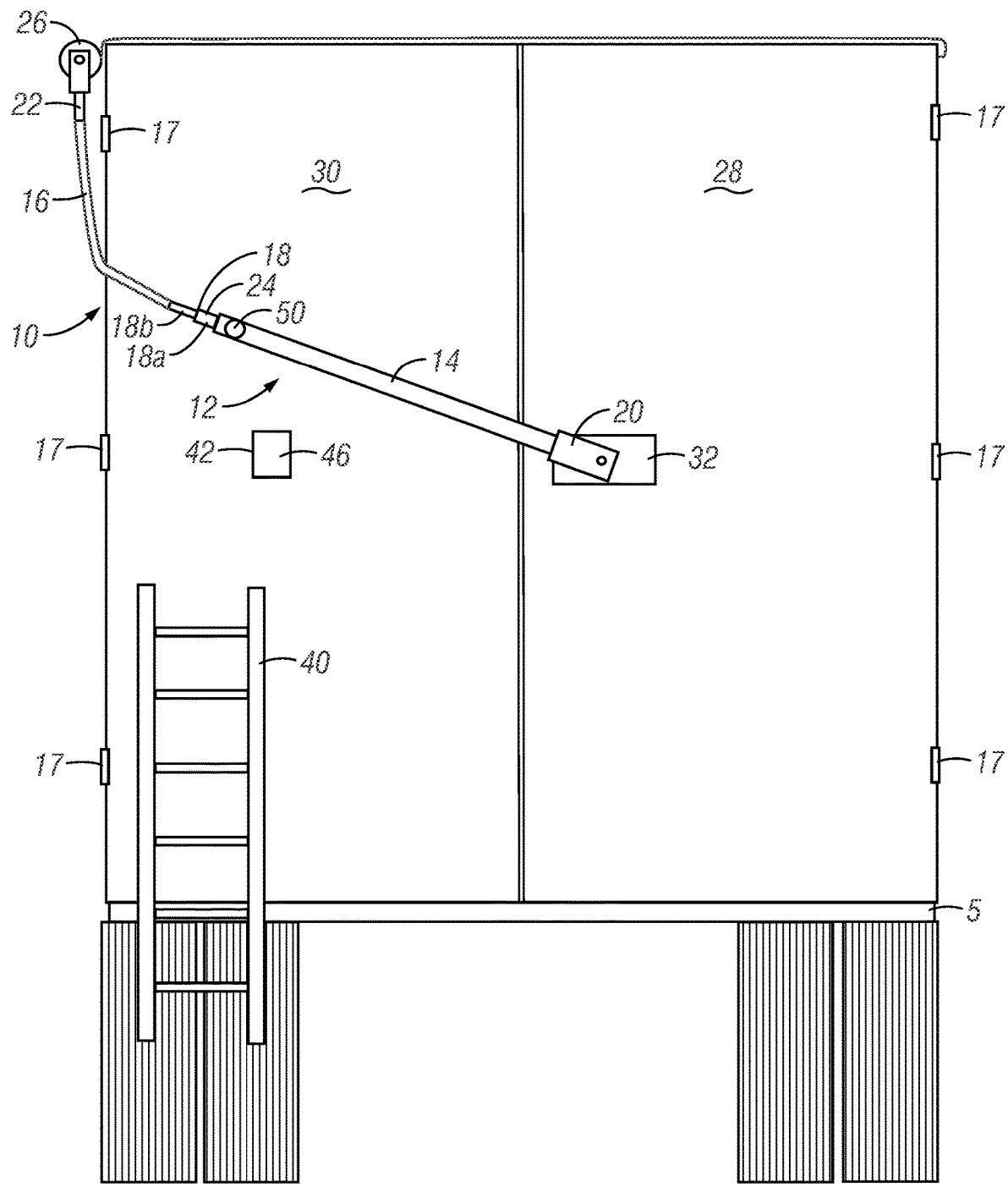
FIG. 1 is a rear elevation view of a trailer with two rear doors with a tarp deploying apparatus that has quick release arms according to one embodiment of the present invention.

FIG. 1 shows a first embodiment of a tarp deploying apparatus 10 that includes features of the present invention for use on a double-door trailer 5. A radial arm 12 includes a proximal radial arm 14 and a distal arm 16 according to one embodiment of the present invention. In the embodiment shown, the proximal radial arm 14 is rigid and the distal arm 16 is flexible. While the invention may work with a rigid distal arm, a flexible arm is preferred because it facilitates the connection and disconnection of the arms 14 and 16 from each other. A pivotal connector 20 is provided at the proximal end of the proximal radial arm 14 for pivotally connecting the radial arm 12 to a mounting bracket 32. A universal connector 22 is provided at the distal end of the distal arm 16 for connecting the radial arm 12 to a tarp spindle. These components are similar to those shown and described in Bremer, U.S. Pat. No. 8,910,996, the entire contents of which are hereby incorporated by reference. The primary difference being that a releasable connection 18 is provided between the arms 14 and 16 that permits them to be easily connected and disconnected from each other. The releasable connection 18 includes a female portion 18a located at an outer end of the proximal radial arm 14 and a male portion 18b located at a first end of the distal arm 16. The female 18a and male 18b portions could be reversed; however, the orientation shown is preferred as it makes connection easer when the male portion is on the flexible distal arm 16. The proximal radial arm 14 is preferably formed from a hard rigid material such as cast or extruded aluminum or other metal. The distal arm 16 is preferably formed from a double-walled hydraulic hose. In the embodiment shown, the connector 18 is a hydraulic coupler of the type that includes a slidable collar 24 on the female portion 18b to release the coupler and allow the arms to be separated.

FIG. 1 shows the radial arm 12 in a closed orientation with the tarp 26 covering the storage area of the trailer 5. The proximal radial arm 14 is mounted to a first door 28 on a mounting bracket 32. As can be seen, in the closed orientation, the radial arm 12 blocks the second door 30 and prevents it from being opened. Furthermore, the first door 28 is prevented from being fully opened because the arm 12 is constrained by being attached to the tarp 26. The doors 28 and 30 are mounted on hinges 17 to swing open outward.

Figure 2:
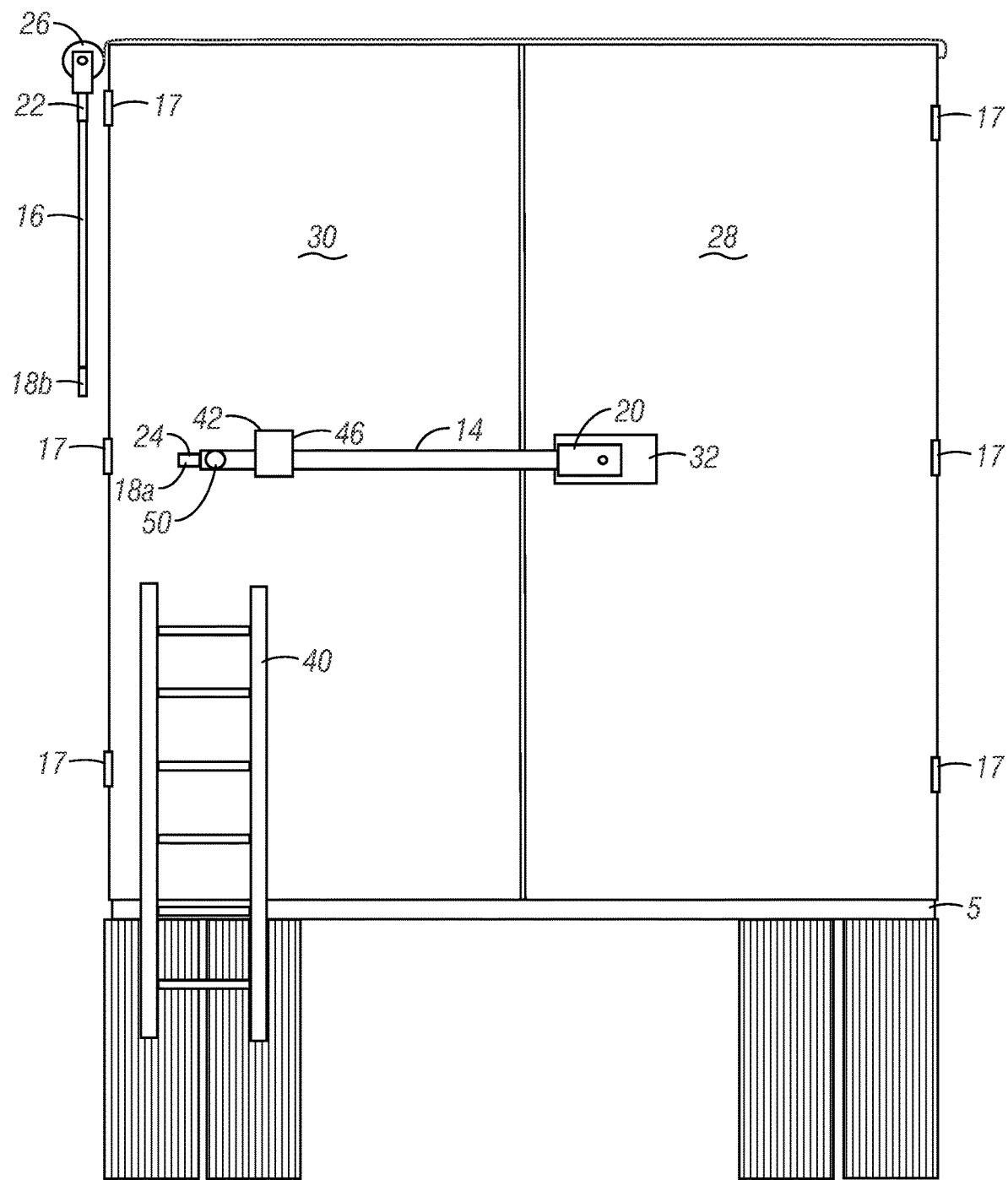
FIG. 2 shows the trailer and tarp deploying apparatus of FIG. 1 with the radial arm of the tarp deploying apparatus separated and the proximal arm resting in a support.

FIG. 2 shows the distal arm 16 released from the proximal radial arm 14. Once the arms 14 and 16 are separated the doors 28 and 30 can be opened to permit access to the storage space covered by the tarp 26. A support bracket 42 is helpful for connecting and disconnecting the arms 16 and 18. The support bracket 42 is mounted to the rear door 30 and will support the weight of the arms 14 and 16 to make it easier for a user to manipulate the releasable connection 18, including the male 18b and female 18a portions and the slidable collar 24. As shown, the support bracket 42 may including a mounting portion and a collapsible support arm 46. The support arm 46 may be retained in the support position of FIG. 2 and a collapsed position using a cottar pin. Alternatively, the support arm bracket 42 may have only a single configuration with a support arm 46 always in the support position. FIG. 2 shows the support bracket 42 in the support position with the proximal arm 14 resting on the support arm 46. The configuration of FIG. 2 represents the situation either immediately before connecting the arms 14 and 16 or immediately after disconnecting them.

Figure 3:
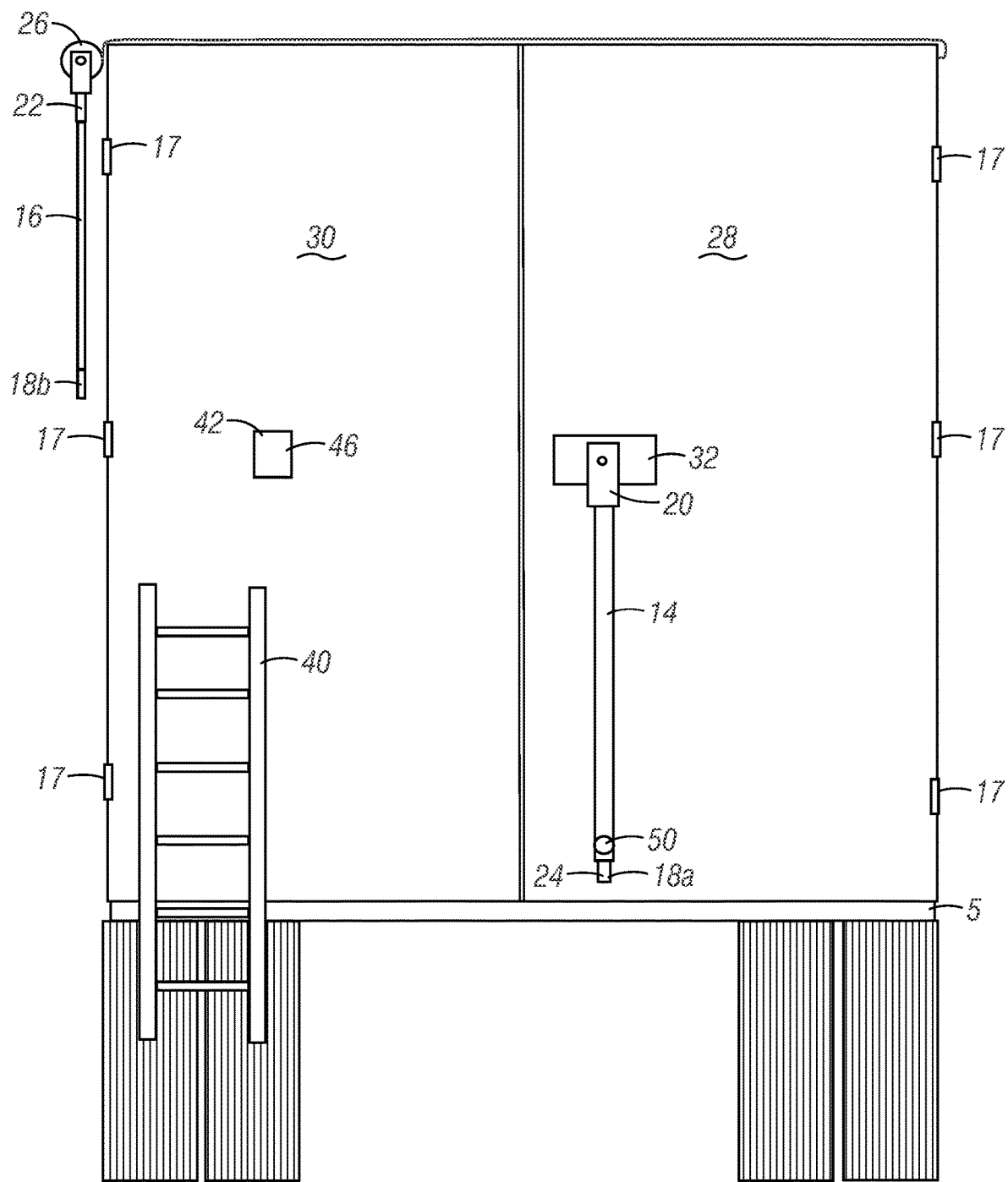
FIG. 3 shows the trailer and tarp deploying apparatus of FIG. 2 with the proximal arm removed from the support and the doors ready to be opened.

FIG. 3 shows door 30 in the apparatus in a position where the doors 28, 30 are ready to be rotated to an open position proximate to the side of the trailer 5. The distal arm 16 hangs down from the tarp spindle. The proximal radial arm 14 hangs down supported on the mounting bracket 32. In this configuration the doors 28 and 30 are not prevented from opening by the deploying apparatus 10.

A ladder 40 is provided on rear door 30 to permit a user to climb up for better access to the arms 14 and 16 during connection and disconnection of the arms 14 and 16 from each other. The ladder 40 shown is a foldable latter that stores on the door 30. Other ladder or step devices may also be used to help a user access the arms 14 and 16 at a convenient height.

The proximal arm 14 may also be provided with a handle 50 that is helpful for manipulating the proximal arm. As seen in the Figures, the handle 50 may extend rearward normal to the proximal arm 14 to be grasped by a user to help lift the arm 12 on to the support bracket 42.

Figure 4:
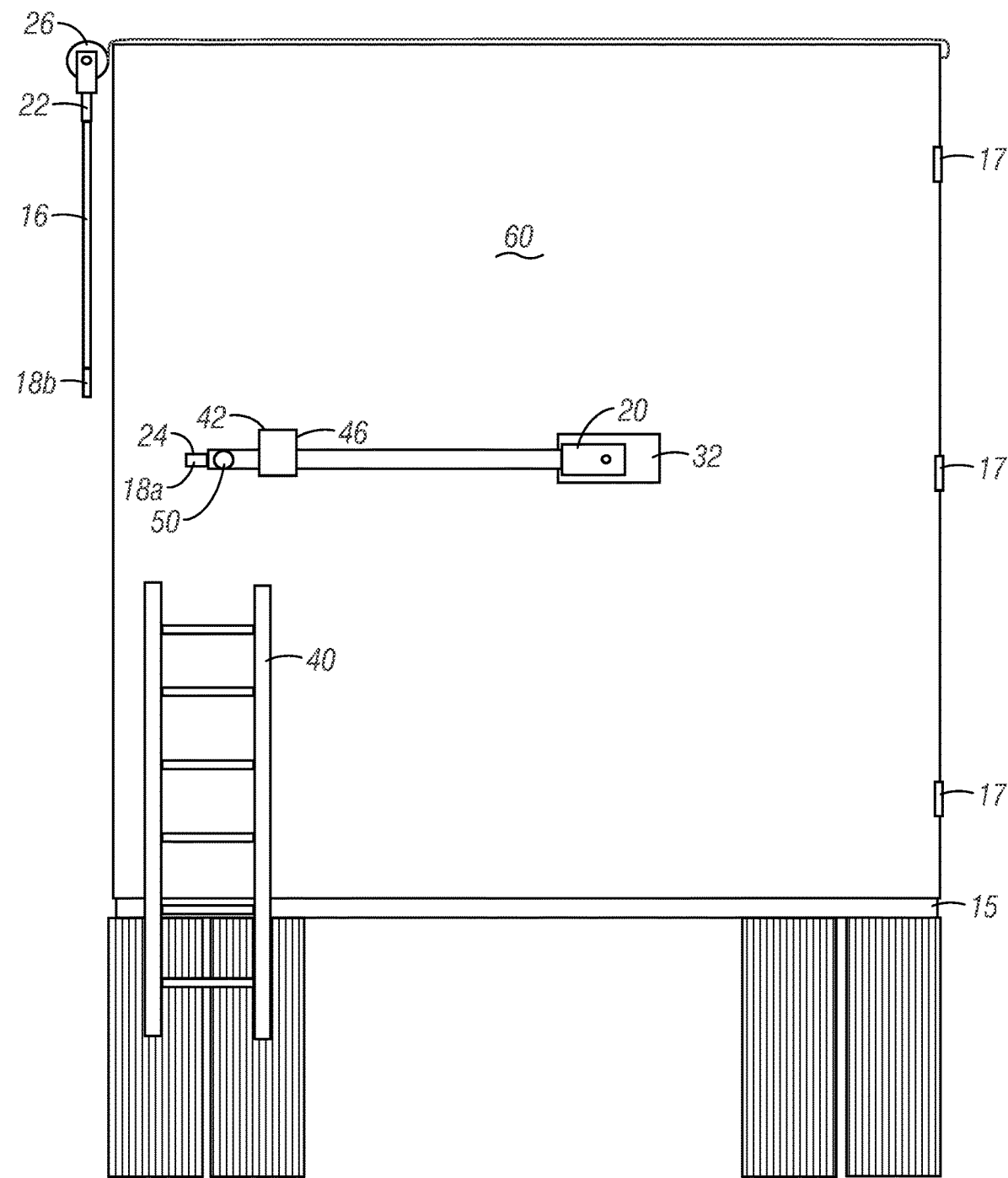
FIG. 4 is a rear elevation view of a trailer with one rear door with a tarp deploying apparatus that has quick release arms according to another embodiment of the present invention.

FIG. 4 shows a tarp deploying system 10 mounted a trailer 15 with a single rear door 60. The rear door 60 swings open to permit a user to enter the trailer. The trailer 15 with a single rear door 60 is especially useful in a trailer adapted for hauling waste materials. The releasable connection 18 permits the arm 12 to be separated to permit the door 60 to be opened whether the tarp is in an open or closed configuration. The system 10 would also work on a trailer where the rear door slides laterally or horizontally to provide access to the storage area of the trailer, or on a trailer with a tracked door similar to what is commonly used on garages.

A preferred embodiment of the present invention has been set forth above. It should be understood by one of ordinary skill in the art that modifications may be made in detail, especially in matters of shape, size, and arrangement of parts. Such modifications are deemed to be within the scope of the present invention, which is to be limited only by the broad general meaning of the terms in which the appended claims are expressed. For example, the connector that permits the proximal and arms to be separated could take any number of known forms for quick connection and release. Alternatively, the releasable connector could be within one of the arms, rather than between the arms, or could be between the radial arm and the tarp.

What is claimed is:

1. A tarp deploying apparatus adapted to be mounted on a trailer having a rear door, wherein the rear door is mounted on a rear portion of the trailer, the apparatus comprising:
   a mounting bracket adapted to be attached to the rear door;
   a proximal radial arm pivotally mounted to the mounting bracket;
   a distal arm having a first end and a second end, the distal arm being connectable to the proximal radial arm at the first end of the distal arm, wherein the distal arm comprises a flexible member to permit angular movement of the second end of the distal arm relative to the first end of the distal arm;
   a tarp spindle mounted at the second end of the distal arm, the tarp spindle having a tarp rolled upon it; and
   a releasable connector comprising a sliding collar coupler connecting the proximal radial arm to the first end of the distal arm.

2. The tarp deploying apparatus of claim 1, wherein the sliding collar coupler comprises a male portion affixed to the first end of the distal arm and a female portion affixed to the proximal radial arm.

3. The tarp deploying apparatus of claim 1, further comprising a support bracket adapted to be mounted to the rear portion of the trailer spaced apart from the mounting bracket to selectively support the proximal radial arm to facilitate connecting and disconnecting the proximal and distal radial arms from each other.

4. The tarp deploying apparatus of claim 3, wherein the support bracket includes a mounting portion adapted to be attached to the door and a collapsible support arm rotatably connected to the mounting portion.

5. The tarp deploying apparatus of claim 4 further comprising a handle attached to the proximal radial arm.

6. The tarp deploying apparatus of claim 1, further comprising a ladder adapted to be positioned on the rear door below a portion of the rear door where the proximal radial arm is located when the tarp is in a closed configuration covering the trailer.

7. The tarp deploying apparatus of claim 1, wherein the apparatus is adapted for use on a trailer having a second rear door adjacent to the rear door, the apparatus further comprising a support bracket adapted to be mounted on the second door to support the proximal radial arm to facilitate connecting and disconnecting the proximal and distal radial arms from each other.

8. A method of using a walk-in trailer with a rear door and a tarp, the method comprising:
   providing a tarp deploying apparatus mounted on the rear door of the walk-in trailer, whereby the tarp deploying apparatus comprises:
      a mounting bracket attached to the rear door;
      a proximal radial arm pivotally mounted to the mounting bracket;
      a distal arm having a first end and a second end, the distal arm being connectable to the proximal radial arm at the first end of the distal arm, wherein the distal arm comprises a flexible member to permit angular movement of the second end of the distal arm relative to the first end of the distal arm;
      a tarp spindle mounted at the second end of the distal arm, the tarp spindle having a tarp rolled upon it; and
      a releasable connector connecting the proximal radial arm to the first end of the distal arm
   disconnecting the distal radial arm from the proximal radial arm using the releasable connector;
   opening and closing the rear door without removing the tarp and without interference from the tarp deploying apparatus; and
   reconnecting the distal arm to the proximal radial arm using the releasable connector.

9. The method of claim 8, wherein the steps of disconnecting and reconnecting are performed without the use of tools.

10. The method of claim 8, wherein the tarp deploying apparatus further comprises providing a support bracket mounted to a rear portion of the trailer spaced apart from the mounting bracket, the method further comprising:
   placing the proximal radial arm on the support bracket to support the proximal radial arm between the steps of disconnecting the distal arm from the proximal radial arm and reconnecting the distal arm to the proximal radial arm.

11. The method of claim 10, wherein the tarp deploying apparatus further comprises a handle on the proximal radial arm, the method further comprising:
   grasping the handle to manipulate the proximal radial arm on to the support bracket during the step of placing the proximal radial arm on the support bracket.

12. The method of claim 8, wherein the tarp deploying apparatus further comprises a ladder mounted on the rear door, the method further comprising:
   climbing the ladder before performing the steps of disconnecting and reconnecting the distal arm from and to the proximal radial arm.

13. A tarp deploying apparatus adapted to be mounted on a trailer having a rear door, wherein the rear door is mounted on a rear portion of the trailer, the apparatus comprising:
   a mounting bracket adapted to be attached to the rear door;
   a proximal radial arm pivotally mounted to the mounting bracket;
   a distal arm having a first end and a second end, the distal arm being connectable to the proximal radial arm at the first end of the distal arm, wherein the distal arm comprises a flexible member to permit angular movement of the second end of the distal arm relative to the first end of the distal arm;
   a tarp spindle mounted at the second end of the distal arm, the tarp spindle having a tarp rolled upon it; and
   a releasable connector connecting the proximal radial arm to the first end of the distal arm, the releasable connector being adapted to permit the coupling and decoupling of the proximal arm and the distal arm without the use of tools.

14. A tarp deploying apparatus adapted to be mounted on a trailer having a rear door, wherein the rear door is mounted on a rear portion of the trailer, the apparatus comprising:
   a mounting bracket adapted to be attached to the rear door;
   a proximal radial arm pivotally mounted to the mounting bracket;
   a distal arm having a first end and a second end, the distal arm being connectable to the proximal radial arm at the first end of the distal arm, wherein the distal arm comprises a flexible member to permit angular movement of the second end of the distal arm relative to the first end of the distal arm;
   a tarp spindle mounted at the second end of the distal arm, the tarp spindle having a tarp rolled upon it; and
   a releasable connector connecting the proximal radial arm to the first end of the distal arm; and
   a support bracket adapted to be mounted to the rear portion of the trailer spaced apart from the mounting bracket to selectively support the proximal radial arm to facilitate connecting and disconnecting the proximal and distal radial arms from each other.

\* \* \* \* \*